United States Patent Office 3,097,096
Patented July 9, 1963

3,097,096
PHOTOPOLYMERIZATION WITH THE FORMATION OF RELIEF IMAGES
Gerald Oster, 134 W. 11th St., New York 11, N.Y.
No Drawing. Original application Jan. 19, 1955, Ser. No. 482,868, now Patent No. 2,875,047, dated Feb. 24, 1959. Divided and this application Jan. 7, 1959, Ser. No. 785,316
19 Claims. (Cl. 96—30)

This invention relates to photopolymerization with the formation of images and is a division of my copending application, Serial No. 482,868, filed January 19, 1955, now issued to U.S. Patent 2,875,047, consolidated with my copending application, 531,284, filed August 29, 1955, now abandoned. The invention more particularly relates to the polymerization of polymerizable vinyl compounds using visible light as a polymerization initiator and with the formation of images.

In my copending application, Serial No. 482,867, now Patent No. 2,850,445, filed on the same day, a process is described for effecting the polymerization of polymerizable vinyl compounds, such as vinyl monomerms, using visible light as the polymerization initiator. In accordance with the said application, a solution containing the vinyl polymer, the photo-reducible dye and the reducing agent and preferably in the presence of oxygen, is subjected to irradiation with visible light, causing the formation of the polymer. The photo-reducible dye and the reducing agent should form a system which is stable in the absence of light, but which undergoes reduction of the dye in the presence of light.

In accordance with the said patent, the polymer formed upon the photopolymerization is insoluble in the starting solution and precipitates out in the form of a divided material or product. Thus, for example, when acrylonitrile in aqueous solution with rose bengal and a mild reducing agent, such as ascorbic acid, is subjected to irradiation with visible light in the presence of atmospheric oxygen, the polymer formed precipitates out as an insoluble powder, and it is not possible to directly form images or a usable, coherent, plastic mass or body, as, for example, a film or coating, a shaped, plastic body, a hardened bonding cement, etc.

One object of this invention is the formation of images by the polymerization of a polymerizable vinyl compound using visible light as the polymerization initiator.

A further object of this invention is the production of forms for multiple ink transfers utilizing the visible light initiated photopolymerization of polymerizable vinyl compounds.

These and still further objects will become apparent from the following description;

The term "image" is used herein to designate any two- or three-dimensional forms, such as lettering, pictures, designs, etc.

The term, "forms for multiple ink transfers" include printing matrices having raised images as in relief printing, recessed images as in intaglio printing, surfaces having different ink retentivity as in lithography; stencils as used in the silk screen process or in mimeographing; master sheets for spirit duplication processes or any other forms which may be used for transferring of images by means of ink or any other colored or pigmented liquid or material to a surface, such as a paper surface.

In accordance with my said copending application 482,868, a polymerizable vinyl compound such as a vinyl monomer is polymerized into coherent plastic mass using visible light as the polymerization exciter. The polymerization is effected by irradiating, with visible light, a liquid solution containing a polymerizable vinyl compound, a photo-reducible dye, and a mild reducing agent.

The dye and the reducing agent must form a stable system in the absence of light which undergoes reduction of the dye upon exposure to visible light. The liquid solution must be a solvent for an uncross-linked polyvinyl polymer corresponding to the polymer formed upon the polymerization of the polymerizable compound. The solution additionally preferably contains a cross-linking agent and the polymerization is preferably effected in the presence of oxygen such as the ambient oxygen.

In accordance with the invention, the image is produced by irradiating the photo-sensitive polymerization mixture of my said copending application with visible light having variations in intensity corresponding to the image to be reproduced.

After the irradiation the unpolymerized portions are removed as by washing, leaving polymerized areas corresponding to the light image with which the starting mixture was irradiated.

The starting photo-sensitive polymerizable mixture may contain the same polymerizable vinyl compounds, photo-reducible dyes, mild reducing agents and solvents in the same amounts and proportions as specified in my said copending application.

The polymerizable vinyl compounds should be present in amounts of at least 20% by weight, and should preferably contain a cross-linking agent. The same cross-linking agents in the same amounts in proportions may be present as specified in the said copending application. Depending on the particular type of form being produced, certain polymerizable vinyl compounds, dyes, and reducing agents have proven preferable.

Thus the starting vinyl compound may comprise any of the known polymerizable organic vinyl compounds, and preferably polymerizable vinyl monomers, such as acrylonitrile, methacrylonitrile, methacrylic acid, acrylic acid, acrylamide, methacrylamide, vinyl pyrrolidone, vinyl acetate methyl methacrylate, calcium acrylate, methyl acrylate, and styrene.

The dyes which may be used in accordance with the invention comprise any known dyes which are capable of forming a stable system with a reduction agent in the absence of light, but which will undergo reduction when irradiated with visible light in the presence of the reducing agent. These dyes include rose bengal, phloxine, erythrosine, eosin, fluorescein, acriflavine, thionine, riboflavin, water-soluble and fat-soluble chlorophylls, hematoporphyrin, etc.

A large number of these dyes are characterized by their fluorescence.

The reducing agents which may be used in accordance with the invention comprise any known reducing agents which, in combination with the particular dye in question, will form a stable system in the absence of light, but which will cause reduction of the dye upon irradiation with visible light. The reduction potential of the reducing agent should therefore be less than that necessary to reduce the particular dye in question in the absence of visible light. These reducing agents include, for example, stannous chloride, ascorbic acid, glutathione, hydroxylamine, hydrazine, phenyl hydrazine, dichlorphenyl hydrazine, thiourea, allyl thiourea, etc.

When the starting compound constitutes a reducing agent itself for the particular dye in question when irradiated with visible light, as, for example, in the case of acrylamide and riboflavin, the presence of an additional reducing agent is not necessary, though the same may enhance the speed of the polymerization. Also in connection with riboflavin the robosose group may act as a reducing agent.

The polymerization is preferably effected in the presence of oxygen, such as the ambient atmosphere. It has been found that polymerization proceeds substantially more rapidly in the presence of this oxygen than when a portion of the inherently present oxygen has been removed from the polymerization solution.

The vinyl compound, dye, and reducing agent should be present in a true liquid system, i.e., in the form of a true solution. As mentioned, in order to form the coherent, plastic mass, the vinyl compound should preferably be present in amount of at least 20% by weight of the solution, and the solution must constitute a solvent for an uncross-linked soluble polyvinyl compound corresponding to polyvinyl compound formed upon the polymerization of the starting vinyl compound. In the case where the vinyl monomer is liquid and constitutes a solvent for the vinyl polymer, as, for example, in the case of styrene, no additional solvent is necessary.

When, however, the starting vinyl monomer is not in liquid form, as, for example, in the case of acrylamide, or where the monomer does not constitute a solvent for such a polymer, as, for example, in the case of acrylonitrile, it is necessary to use an extra solvent, in which the vinyl polymer is soluble. Thus, for example, in the case of acrylonitrile, a zinc chloride solution may be used as a solvent, and in the case of acrylamide, water may be used as the solvent.

The amount of solvent used is not critical, and the minimum operable amount need only be sufficient to form a true liquid solution of all of the components. Amounts of solvent up to about 90% and more of the entire solution may be used, though it is preferable if the amount of solvent does not exceed to about 65% of the solution.

It is preferable, in accordance with the invention, to use a cross-linking agent so that the polyvinyl compound formed, as a result of the polymerization in accordance with the invention is a cross-linked polymer, which of course is insoluble. The test for the type of solvent used in accordance with the invention is, therefore, not whether the actual polymer produced in accordance with the invention is actually soluble therein, but whether this solvent constitutes a solvent for an uncross-linked soluble polymer corresponding to the polymer formed by the photopolymerization in accordance with the invention. Thus, for example, if the starting vinyl monomer is acrylonitrile, the solvent vehicle should be a solvent for an uncross-linked soluble solid polyacrylonitrile. In the same manner when polymerizing certain divinyl compounds, as for example, calcium acrylate, a cross-linked insoluble polymer is directly formed. In this case the solvent should be a solvent for a corresponding uncross-linked polymer as, for example, the polymer formed in the early stages of polymerization and in still soluble form.

While the concentration of the dye in the solution is not critical, the most efficient results are obtained where the concentration is adjusted, so that at least about 95% of the incident light striking the solution and having a wave length corresponding to the absorption maximum of a particular dye, is absorbed.

Similarly, the amounts of reducing agent are not critical and amounts from about 0.01% by weight to the maximum solubility of the reducing agent in the solution have proven effective.

In the case of certain dyes which are acid-sensitive, as, for example, riboflavin, and when using an acid-reducing agent, it may be necessary to buffer the solution, as, for example, with a phosphate buffer, to obtain a neutral pH.

In order to effect the polymerization, the system is merely irradiated with visible light, i.e., light having a wave length between about 400 and 760 millimicrons.

Actually, it is only necessary to irradiate with the wave length for which the particular dye in question has a maximum absorption. Since, by very definition, the dye is a colored substance, this wave length of maximum absorption will always be in the visible light range. Therefore, in all cases it is merely necessary to irradiate with visible light.

The solution may, of course, contain several vinyl compounds and/or reducing agents.

Upon the irradiation the vinyl compound proceeds to polymerize, forming a coherent plastic mass. The viscosity of the mass is dependent upon the degree of polymerization and is proportional to the amount of the vinyl compound in the starting solution.

The complete polymerization proceeds extremely rapidly, as, for example, in the course of several minutes, or even several seconds, depending in part upon the intensity of the light and no heat or pressure is required.

The rate of polymerization is roughly proportional to the intensity of the light absorbed by the dye, and the degree of polymerization to the amount of light absorbed by the dye.

In order to obtain a more resistant plastic, as, for example, a water-insoluble plastic, in the case of normally water-soluble polymers, such as methacrylic acid, acrylic acid, acrylamide, methacrylamide, vinyl pyrrolidone, etc., and in order to obtain a plastic which is more resistant to solvents in any case, it has been found preferable to add a cross-linking agent to the starting solution.

Any of the conventionally known cross-linking agents which will join the linear polymer chains may be used. These cross-linking agents contain at least two reactive polymerization groups in the molecule and include, for example, N,N-diallylmelamine, N,N'-methylbisacrylamide, triallyl cyanurate, divinyl benzene, etc.

The cross-linking agent may be present in any amount up to its maximum solubility in the solution, and the greater the amount of the cross-linking agent, the more solvent-resisting will be the plastic body, amounts of at least 0.1% are preferable.

When the starting vinyl monomer will polymerize directly into a cross-linked polymer, as, for example, in the case of divinyl monomers, such as calcium acrylate, the use of a separate cross-linking agent is, of course, not necessary.

It has further been found preferable to add a compound which will reduce the rate of termination of the polymerization reaction, and thus increase the speed of the polymerization. For this purpose a low-molecular weight thickening agent which will increase the viscosity of the solution may be used. Low-molecular weight polyhydroxy organic compounds, such as glycerol, sucrose and dextrose have proven preferable. These compounds may be present in any amount up to their maximum solubility in the solution.

In order to produce the images this starting solution may be used as a photosensitive emulsion in place of any of the prior known photosensitive emulsions, as, for example, standard photographic film, plates or printing paper. For this purpose it is merely necessary to apply the solution to a suitable backing, as, for example, any conventional photographic backing, such as a glass plate, paper backing, plastic backing, etc. It is preferable if the solution is held in place on the backing by a suitable material, such as gelatin. For this purpose, it is also possible to prethicken the solution, as for example, by partial polymerization. The solution in this form is then irradiated with visible light having variations in intensity corresponding to the image to be reproduced.

The irradiating with visible light having variation in intensity corresponding to the image to be reproduced may be effected in any known or desired manner of forming a light image as for example by irradiating with visible light through a photographic positive or negative transparency; by projecting a transparency or reflected image or passing light through a translucent printed or typewritten sheet, or through the mixture onto the printed or typewritten sheets, etc.

After the exposure of the emulsion incorporating the solution according to the invention, no chemical developing steps are necessary and it is merely necessary to wash the exposed emulsion with a solvent for the starting monomer with water. The emulsion, after the washing, will have polymerized portions corresponding to the irradiated areas.

In the case of photosensitive emulsions which are intended for photographic use, the solution should contain at least three dyes, each having an absorption maximum for a different one of the three primary colors. Thus, for example, acriflavine, rose bengal, and methylene blue may be used as the dyes in the emulsion.

For color photography, a three-plate system may be used, as for example, in a standard, one-shot, three-color camera. Each of the emulsions should incorporate a different dye which absorbs a different one of the primary colors. Thus, for example, one of the emulsions may contain acriflavine, the other rose bengal, and the third methylene blue as the dye material.

The solutions may also be used for forming photoimages in relatively high relief, which are excellently suited for display purposes, making contour maps, etc. In order to achieve this effect, it is merely necessary to apply a greater depth of the starting solution to the backing. Thus, for example, the solution may be poured into a tray having a glass bottom and irradiated by projecting the image through the glass onto the solution. If, for example, a contour map is made up in the form of a transparency, having a decreasing density proportional to an increase in height, and the irradiation is effected through this transparency an exact three-dimensional contour image may be formed which is useful for many purposes.

While the solutions, in accordance with the invention, are generally insensitive to higher energy irradiation such as X-ray, gamma rays and the like, the same still may be used for making radiographic images. For this purpose, the solution may be applied over a fluorescent screen, as for example a screen containing phosphors or a backing containing the solution may be placed adjacent to such a fluorescent screen. Irradiation with roentgen rays, such as X-rays, in the conventional manner, will cause fluorescence of the screen corresponding to the intensity of the irradiation. This visible light fluorescence will then polymerize the solution in accordance with the invention in the same manner as if the same were directly irradiated with visible light. It is possible to use the solutions in accordance with the invention to form sharp, X-ray photographs. This application has the advantage over conventional X-ray films in that the same is insensitive to the roentgen irradiation until placed adjacent the fluorescent screen and thus will not be fogged or in other ways damaged by the stray radiation which has become prevalent and constitutes a serious problem in this connection. The solution, thus, for example, may be used for the nondestructive testing of welds, pipes, and other structural members. For this purpose, for example, the solution is coated on a flexible backing, such as flexible tape, which is wound around the structural member, such as the pipe. The tape is then coated or precoated with a fluorescent material, such as a phosphor, and irradiation of the structural member is effected in the conventional manner, as for example by means of an X-ray machine or a source of radio-active cobalt 60 inserted in the center of the pipe. After the irradiation the tape is removed, the unpolymerized portion washed out, leaving the polymerized portion, forming the X-ray image.

In order to produce a printing matrix of the relief type, the starting photosensitive polymerization solution may be placed on a suitable backing, as for example a plate such as a copper plate in the form of a thin film. The plate should then be illuminated with a negative image, as for example through a photographic negative or by projection of a photographic negative. Polymerization occurs at the illuminated areas and the unpolymerized portions are removed as by washing. The washing may be effected with any liquid which will not affect the polymer formed, as for example water in many cases. This leaves the polymerized portion in the form of raised images corresponding to the negative through which the illumination was effected. After drying the plate may be inked in the conventional manner and used for printing. With most plastics such as cross-linked polyacrylamide, the image is sufficiently hard and durable to make an extremely large number of impressions. If, however, a more durable plate is desired, the plate may be electroplated as, for example, after coating the surface with a conductive material, such as a liquid suspension of graphite. Instead of using a flat plate, a curved or cylindrical plate may be used if the matrix is to be ultimately used on a rotary press.

Alternately the face plate may be etched, as for example, with ferric chloride since the raised polymerized portions corresponding to the image are more acid resistant than the remainder of the plate. After the etching a sharp raised relief is formed corresponding to the image.

In making etched plates the relief images of the polyvinyl compounds may be made more acid resistant by dusting the same with a powdered acid resistant material such as beeswax, resin, polyethylene, nylon or another thermo-plastic resin. The powder will adhere to the tacky polymerized areas which correspond to the illuminated areas, and the remaining powder may be blown away. Upon baking, the thermo-plastic material will form an acid resisting coating so that the backing plates, such as the copper plates, may be etched and the areas which correspond to the areas which were not illuminated will be eaten away, while the remaining illuminated areas will remain as a relief.

Matrices for color printing may be affected in the same manner, by illuminating the photosensitive polymerization mixture through a color transparency with a projection of a negative color transparency. In this case 3 separate plates must be made each for printing with a different primary color. In this connection 3 plates should be made up, each using a photosensitive polymerization mixture containing a photo-reducible dye sensitive to a different primary color. For example, one plate may be coated with the photosensitive polymerization mixture containing blue sensitive riboflavin as the photoreducible dye. The blue areas of the negative image, which of course corresponds to the yellow areas of the positive, will be polymerized. This plate may then be inked with a yellow colored ink. In the same manner the red sensitive plate which is to be inked with a cyan colored ink may be made up using methylene blue as the photo-reducible dye and the green sensitive plate to be inked with magneta colored ink may be made up using rose bengal as a photo-reducible dye. Alternately, in place of the rose bengal, yellow sensitive thionine may be used and the plate inked with purple ink.

Alternately, 3 plates may be made up each having a different coating of the photosensitive polymerization mixture which is sensitive to the 3 primary colors, i.e. contains dyes which are blue-sensitive, red-sensitive, and green or yellow-sensitive, as for example a mixture of the above mentioned dyes. In order to make the plate to be inked with yellow ink, one of the plates may be illuminated with a blue light or through a blue filter. In the same way the magenta and cyan inked plates may be made by illuminating through green and red lights or through green and red filters respectively.

Recessed plates for intaglio printing may be made in the identical manner as the relief plates except that a positive image should be used in the place of the negative image.

For color intaglio printing a positive color image should be used in place of the negative color image used in relief printing. This image may be formed, for example, by projection or contact printing of an ordinary positive color transparency, or, for example, by reflection projection of an ordinary color picture. Three sensitive plates should be made up, each containing photo-reducible dye mixtures which have an absorption maximum for all of the primary colors except one, with each of the plates lacking the absorption capacity for a different one of the primary colors. Thus, for example, a first plate may contain a mixture of a blue-sensitive dye, such as riboflavin, and a green or yellow-sensitive dye, such as rose bengal or thionine. The second plate may contain a mixture of a blue-sensitive dye, such as riboflavin, and a red-sensitive dye, such as methylene blue, and the third plate may contain a mixture of a red-sensitive dye, such as methylene blue with a green or yellow-sensitive dye, such as rose bengal or thionine. After the exposure of the first plate with the photo-positive color image, the areas corresponding to the red areas on the image will not become polymerized and will be washed out. This plate is then used for the intaglio printing inked with magenta-colored ink, so that the magneta-colored ink will be retained in the intaglio recesses which corresponded to the red portion of the image, and, upon printing, will print this corresponding color. Similarly, the second plate is inked with a green-colored or yellow-colored ink, depending upon whether rose bengal or thionine was used in the other plates. The third plate is inked with a cyan-colored ink.

Since intaglio plate is made from a positive image the same may be used as a mold for forming a raised printing matrix. Thus, for example, the intaglio plate may be covered with a low melting metal such as Wood's metal, which after hardening and removing of the polymerized material gives sharp relief image which may be used for making multiple copies, as for example in newspaper printing. This embodiment has extremely interesting possibilities since newspaper plates could be made without need for a Linotype by merely, for example, typing the pages on a typewriter or electric typewriter, photographing the same to form a positive transparency or microfilm and making the intaglio mold therefrom. In this connection, where identical newspaper pages are to be printed in various parts of the country it would only be necessary to ship the microfilm rather than the cumbersome papier-mache forms as is conventionally done today.

Lithograph plates may be made in the identical manner as a relief plate using a polymerizable vinyl compound which is polymerized from shows an affinity for the lithographic inks. Thus, for example, when using the conventional lithographic ink monomers such as N-tertbutyl acrylamide and N-octyl acrylamide which form hydrophobic polymers may be used as a polymerizable vinyl compound. In the same manner, if it is desired to use a water base ink, monomer such as acrylamide and vinyl pyrrolidone which form hydrophilic polymers may be used as the polymerizable vinyl compound.

The colored lithography plates may be made in the same manner as described above in connection with the color relief printing.

Since the degree of polymerization of the photosensitive polymerizable material will depend upon the quantity of light which strikes the same, the printing matrix will produce an exact reproduction of the images with which they are illuminated. If the images are of continuous tone, the resulting printing matrix will produce continuous tone image ink printing. Thus, for example, upon making an intaglio plate the recess image will be deeper in the areas of lesser illumination.

The production of the printing matrices in connection with the invention has many advantages as compared with the conventional production of such matrices, as for example, by the bichromate or diazo methods. In accordance with the invention visible light is used as the activating force whereas in the prior methods ultraviolet light was required as the initiator. As contrasted to the use of ultra-violet light a large number of readily obtainable and economical sources are available which emit visible light as, for example, tungsten filaments. Such a source of visible illumination is, for example, readily available in many forms which are adapted for projection work or contact printing. When using visible light it is extremely easy to project the image whereas with ultra-violet light it is extremely difficult to effect such a projection. The focusing of the image can only be effected visibly and with a sharp focus in the visible region, it does not necessarily follow that the light will be sharply focused in the ultra-violet region. Further, most of the lenses are ground and designed for the visible light range and severe chromatic aberration occurs in the ultra-violet region. The invention thus for the first time allows the formation of printing matrices with images formed by projection, using, for example, commercially available enlargers, lens, slide projectors or reflection projectors. It is thus possible to enlarge or contract the images. Another advantage of using visible light rather than ultra-violet light is that with visible light there is much less light scattering than with the shorter ultra-violet ray. As a consequence a better definition and resolving power is attainable. With the use of visible light it is possible, as described above, to directly use color transparencies which when using ultra-violet radiation require relatively cumbersome color separation intermediate negative process.

The method in accordance with the invention is at least one hundred times faster for the same light energy as that of the prior art. In fact the over-all polymerization of the photosensitive polymerization mixture can occur in a fraction of a second. In practice this results in extreme image sharpness since the image does not have a chance to diffuse away in such a short period of time.

As contrasted to the prior art it is possible in accordance with the invention, due to the high sensitivity, to effect the illumination with a single light flash, as for example it can be obtained from an ordinary photographic light flash bulb.

In order to make forms for multiple ink transfers in the form of stencils, as for example, as used in the silk screen process or in mimeographing, an ink permeable sheet such as a silk screen, a wire mesh, or tissue paper as is used for conventional mimeograph sheets but without the wax coating, is immersed in or wetted or coated with the photosensitive polymerization mixture. Thereafter the excess liquid may be pressed off the sheet, the sheet dried to the touch. In producing a sheet which is dry to the touch, materials such as a mixture of dextrin and dextrose may be added to the polymerization mixture. If an image is projected onto the sheet, the areas which are illuminated will become polymerized and thus impermeable to the ink. The portions which have not been illuminated may be washed out and will remain permeable. Thus when ink is forced against the sheet and the sheet is pressed against a suitable backing such as paper, the ink will only pass through the unpolymerized portions. In this manner excellent reproductions may be made from photo positive images, the ink being pressed through the stencil in the conventional manner for the printing proper. The stencils are excellent for mimeographing in which connection conventional mimeograph tissue which is unwaxed or which has had the waxed coating removed may be used as the permeable backing sheet. It is possible to make the mimeograph stencils from regular translucent typewritten or printed sheets by merely illuminating the stencil through the sheets. In the same manner photo positive transparencies or the like may be used. It is thus possible for the first time to reproduce photographs or similar pictures in mimeographing. Color printing may also be effected from these stencils using a positive color image, as for example, from a color transparency and projecting same or contact printing the same on 3 backing sheets each containing a photosensitive polymerization mixture with a mixture of photo-reducible dyes each insensitive to a different primary color but sensitive to the other primary colors. For example, one sheet may contain the yellow sensitive thionine dye and the red sensitive methylene blue dye and may be printed in connection with the cyan colored ink, the other sheet may contain riboflavin and thionine and be printed by forcing and pressing magenta colored ink therethrough, and the third may contain riboflavin and methylene blue dye and may be printed with the yellow colored ink. If rose bengal is used in place of the thionine the last mentioned sheet should be printed with green ink.

For master forms for spirit reproduction, the photosensitive polymerization mixture additionally containing gelatin and crystal violet may be formed in the form of a flat surface, for example, by coating on a sheet or pouring into a tray. The surface is then illuminated with a positive image, as for example, from a typewritten sheet of paper or printed sheet, etc. As a result of the irradiation the illuminated portions are polymerized locking the crystal violet dye therein. The unilluminated portions which correspond to the printed letters, etc. contain the crystal violet in a form which may be released. Thereafter upon wetting a sheet of paper with methanol and placing the same in contact with the polymerized sheet, the crystal violet will be quickly transferred to the white paper in those unpolymerized portions, i.e., those portions which were not illuminated, resulting in a conventional spirit copy of the original.

It is also possible to make a spirit transfer master sheet, using a photo-negative image and a polymerizable vinyl compound which will form a vinyl polymer which will retain a transfer dye, such as the crystal violet, after polymerization and washing out of the unpolymerized portions, but which will release the same upon contact with a paper sheet wetted, for example, with methanol.

It is also possible in accordance with the invention to make simple transfer stamps corresponding to common rubber stamps. This may be effected by illuminating a relatively thick layer of the photosensitive polymerization mixture, as for example, in a tray or dish with a photo negative image. The illuminated portions will polymerize in relatively high relief, and after the unpolymerized portions are washed out, this relief may be directly used as a "rubber stamp."

The photosensitive polymerization mixture may be formed on a suitable backing in "dry" form by incorporation of gelatin, detxrin, gum arabic, polyvinyl, alcohol, mixture of dextrose and dextrin or other suitable binding materials conventionally used to give a dry film. In this form the sensitive material is extremely well-suited for handling and storage and may be placed against a transparency or the like for "contact printing." Furthermore, if the monomer is crystalline, as is the case of acrylamide, and dextrose and dextrin are added in suitable amounts, then on drying the film at about 80° C., the film is dry to the touch and no crystals have appeared. The additive to form a "dry" coating are preferably added in amounts of about 10–20% by weight of the total mixture.

The photosensitive mixture exhibits a certain induction period, i.e., a certain period during which it may be exposed to light with no polymerization occurring but after which exposure to an additional quantity of light will cause polymerization very rapidly. This induction period may be shortened by the addition of materials such as allylthiourea or thiourea and is also effected by the viscosity of the mixture and may be reduced by the introduction, for example, of glycerol. The induction period is extremely useful in practice as it allows the plate or the like containing the photosensitive positive polymerization mixture to be handled in ordinary daylight and thereafter to be exposed to the image with more intense illumination which will affect the selected polymerization of the illuminating portions corresponding to the image. For projection work a more sensitive mixture is generally necessary. For this purpose the mixture may be presensitized with an amount of illumination of sufficient intensity and time to substantially reduce the induction period, but not of a sufficient intensity and time to effect polymerization. After this preelimination the image may be projected on the highly sensitive layer.

Since the starting polymerizable vinyl compound may be any of the known polymerizable compounds, and at least fifty such compounds are commercially available, it is possible to obtain a wide variety of physical properties in accordance with the invention. Additionally, it is possible to mix monomers in various proportions and make copolymers which have properties which differ from the polymers of the individual starting monomers.

With the use of cross-linking agents which preferably are di-vinyl or tri-vinyl or di-allyl or tri-allyl compounds the desired hardness and tendency toward swelling may be obtained. It is possible to use vinyl compounds which have good adhesion or hydrophobic or hydrophilic properties as desired. With certain vinyl compounds, water may be used as the sole solvent for the reaction mixture rendering the use of expensive and inflammable organic compounds unnecessary.

A further feature of the invention resides in the fact that the photosensitive polymerization mixture used in accordance with the invention, as for example, the film formed on a plate or other suitable backing is completely stable in the dark and thus may be stored and used in the same manner as ordinary photographic film. In direct contrast to this, the plates used in the bichromate process are unstable and tanning reaction between the bichromate gelatin or other polymer substrate takes place in the dark. As a consequence of this the bichromate gelatin type films must be made up just prior to use. In contrast to the plates used in the diazo process, the photosensitive polymerization mixture is not appreciably sensitive to temperature though prior to illumination of the plate with the image the temperature of the plate should be in the neighborhood of about room temperature.

The following examples are given to further illustrate the invention and not to limit the same. It is of course understood that in place of the mixtures specified and of the mixtures set forth in said copending application may be used. Unless otherwise specified the irradiation in the examples is effective with visible light from a 500 watt tungsten projection lamp position nine inches from the photosensitive surface.

*Example 1*

A solution having the following constituents was formed:

| | Grams |
|---|---|
| (1) Acrylamine | 40 |
| (2) N,N′-methylenbisacrylamide | 0.5 |
| (3) Riboflavin | 0.05 |
| (4) Polyethylene glycol | 50 |
| (5) Water to make up to 100 milliliters of solution. | |

A portion of the solution was placed on a copper plate and spread out in the form of a film about 1 mm. in thickness. Interposed between the lamp and the plate was a photographic negative containing line drawings and figures. After illumination for ten seconds, the plate washed with water to remove the unreacted portions. A raised image or relief which is suitable for printing as a printing template remained after the plate had been dried. The image was hard and a durability sufficient to make at least 1,000 impressions. If a more durable plate is desired, the photo-image produced above, may be painted over with a liquid solution suspension of graphite. The plate then serves as a pole in an electrolytic cell for electrodeposition of metal on to the plate, thereby building up a hard and extremely durable image. In this case, as well as in the cases below, the image can be produced on a curved or cylindrical surface, so that it can be used in a rotary press.

*Example 2*

A solution having the following constituents was formed:

| | Grams |
|---|---|
| (1) Methylacrylamide | 1 |
| (2) Acrylamide | 30 |
| (3) N,N'-methylenebisacrylamide | 0.5 |
| (4) Riboflavin | 0.05 |
| (5) Polyacrylamide | 20 |
| (6) Water to make up to 100 milliliters of solution. | |

A portion of the solution was placed on a copper plate and spread out in the form of a film of about 0.1 mm. in thickness and allowed to dry. A photographic negative was placed against the photo-sensitive surface and irradiated for one minute. The sample was then washed with a 30% formaldehyde solution (in water) and baked at 100° C. for ten minutes. The hardened image was acid resistant. On treatment with a 20% solution of ferric chloride, the copper plate was etched in those portions of the plate which have not been illuminated but unetched where the image has been formed. The result is a sharp, raised relief.

*Example 3*

A solution of:

| | Grams |
|---|---|
| (1) Acrylamide | 40 |
| (2) N,N'-methylenebisacrylamide | 0.5 |
| (3) Riboflavin | 0.1 |
| (4) Glycerol | 60 |
| (5) Water to make up to 100 milliliters of solution. | |

The solution is spread on a copper plate to a thickness of about 0.1 mm. An image through a photographic negative is projected on the plate for a period of one minute. The plate is then washed with water. The light struck areas are tacky. A resin powder consisting either of pulverized beeswax, or of rosin, or of polyethylene, or of nylon, or other thermoplastic resin is dusted on the sample. The powder adheres only to the light struck areas and the remaining powder is blown away. On baking the plate at 150° C. for 10 minutes a durable acid resistant coating is formed on the illuminated areas. The etch is carried out with a 20% ferric chloride solution.

*Example 4*

A solution of:

| | Grams |
|---|---|
| (1) Acrylamide | 40 |
| (2) N,N'-methylenebisacrylamide | 0.1 |
| (3) Riboflavin | 0.001 |
| (4) Glycerol | 80 |
| (5) Water to make up 100 milliliters of solution. | |

The solution was placed in a Petri dish to a thickness of one centimeter. The sample was irradiated with visible light (on the top of the solution) through a photographic negative for ten seconds. The sample is then washed with water and allowed to dry at room temperature. The sample is rubbery and serves as a convenient "rubber" stamp.

*Example 5*

A solution of:

| | Grams |
|---|---|
| (1) Acrylamide | 40 |
| (2) N,N'-bisacrylamide | 2 |
| (3) Riboflavin | 0.05 |
| (4) Ethylene glycol to make up to 100 milliliters of solution. | |

The solution was spread on a copper plate to give a thickness of about 0.5 mm. The sample was irradiated with a tungsten lamp through a photographic positive for one minute. The plate was washed with water and gave a recessed image suitable for intaglio printing. The positive possessed continuous tone and the recessed image was deeper where the transparency of the positive was greater. That is, the plate exhibited continuous tone.

The cavities or recessed portions of the plate can be filled with, for example, an electrically conducting plate and used for intaglio printing for printed circuits.

The intaglio plate was covered with low melting Wood's metal and allowed to harden. The newly formed metal plate was then stripped off to give a sharp relief image. In this way many copies of the original image were made such as would be needed for newspaper printing.

*Example 6*

A solution of:

| | Grams |
|---|---|
| (1) Acrylamide | 20 |
| (2) N-tertiarylbutyl acrylamide | 20 |
| (3) Riboflavin | 0.001 |
| (4) Triallycyanurate | 0.1 |
| (5) Polyvinylpyrrolidene | 10 |
| (6) Methanol to make up to 100 milliliters of solution. | |

The solution is spread on an aluminum plate which had been brushed and treated with 5% phosphoric acid and washed with water. The film is dry to the touch, very stable in the dark and hence serves as a presensitized lithographic plate. A photographic negative is placed against the photosensitive surface. After illumination for one minute, the sample is washed with methanol. The portions of the plate which had been illuminated repel water but lithographic inks adhere to it. This surface makes an excellent lithographic plate for off-set printing.

*Example 7*

Plates were made up as in Example 6 but the riboflavin was replaced with (*a*) rose bengal (0.001%) and 0.01% allyl thiourea and another plate (*b*) is made up with the riboflavin replaced by methylene blue (0.001%) and thiourea (0.01%). The three plates containing the sensitized riboflavin, rose bengal and methylene blue respectively are used to make three lithographic plates from a single negative color transparency. For example, a blue image on the transparency negative (representing a yellow image on the color positive) will effect only the plate containing riboflavin while a red image on the negative (representing a blue image on the color positive) transparency will effect only the plate containing methyleneblue. The three lithographic plates thus produced are inked with their complementary colors and printed alternately on paper (via off-set). The plate with the riboflavin is printed with yellow ink, the plate with rose bengal magenta colored ink and the plate with methylene blue with cyan colored ink.

*Example 8*

A fine silk screen or wire mesh was immersed in a solution of:

| | Grams |
|---|---|
| (1) Acrylamide | 40 |
| (2) N,N'-methylenebisacrylamide | 0.1 |
| (3) Riboflavin | 0.05 |
| (4) Dextrin | 20 |
| (5) Dextrose | 10 |
| (6) Water to give 100 milliliters of solution. | |

The excess liquid was pressed out and the screen was allowed to dry. A photographic positive was projected on the screen for ten minutes. The screen was then washed with water. Ink was pressed through the screen, as in silk screen printing, on to a sheet of paper. The image was extremely sharp and brilliant.

The treated screens prior to illumination with the image are stable in the dark and hence are suitable as presensitized silk screens.

Example 9

A tissue paper such as that used in mimeograph stencils but with the wax removed was immersed in a solution of:

| | Grams |
|---|---|
| (1) Acrylamide | 20 |
| (2) N-tertiary octylacrylamide | 2 |
| (3) N-tertiary butylacrylamide | 10 |
| (4) Methylacrylamide | 2 |
| (5) Triallycyanurate | 0.1 |
| (6) Riboflavin | 0.001 |
| (7) Polyvinylpyrrolidone | 10 |
| (8) Methanol to give 100 milliliters of solution. | |

Excess solution was pressed out and the paper was allowed to dry. Over this paper was placed a semitransparent ordinary letter paper containing typewritten letters. After irradiation for one minute the tissue papers was washed with methanol and dried and applied directly to a mimeograph machine. The result was a clear image of the original letter of which at least 1,000 copies can be made. A photographic positive can replace the typewritten letter. The result is a good image is produced which is only limited in resolution by the graininess of the tissue paper. A better image for mimeographing is to replace the tissue paper by a fine silk screen. The image can also be produced by projection from a photographic positive.

The sensitized tissue is stable in the dark and hence constitutes a presensistized mimeograph stencil. If the photographic positive is half tone the mimeographed image will also be half tone.

Example 10

A solution of:

| | Grams |
|---|---|
| (1) Acrylamide | 20 |
| (2) N,N'-methylenebisacrylamide | 0.2 |
| (3) Riboflavin | 0.05 |
| (4) Gelatin | 5 |
| (5) Crystal violet | 0.1 |
| (6) Water ot make up to 100 milliliters of solution. | |

The solution at a temperature of 60° C. is poured into a tray to give a layer of 1 centimeter thickness and allowed to gel. A photographic positive or a sheet of paper containing typewritten figures and line drawings is placed over the layer. After irradiation with visible light for five minutes, a white sheet of paper wetted with alcohol is placed on the layer. Crystal violet is quickly transferred to the white paper from those portions of the paper which had not been illuminated. The result is a copy of the original where violet is replaced by the black portions of the original and the white areas of the original are still white on the copy. In this way at least 100 copies of the original can be made.

Example 11

Three plates were made up which were coated with the solution of Example 5, except that in the first plate the riboflavin was replaced with a mixture of riboflavin and rose bengal, and that in the second plate the riboflavin was replaced with a mixture of riboflavin and methylene blue, and in the third plate the riboflavin was replaced with a mixture of methylene blue and rose bengal. The plates were each exposed with a projected image of an ordinary 35 mm. color transparency. After exposure, the plates were washed with water. The first plate was inked with a magenta colored ink and wiped in the conventional manner for intaglio printing. The second plate was inked in the same manner with a green colored ink, and the third plate with a cyan colored ink. Superimposed images were printed on paper with the three plates, and an excellent printed color reproduction of the color transparency was formed.

Example 12

Three solutions corresponding to the solution of Example 8 were made up, except that in the first solution the riboflavin was replaced by a mixture of riboflavin and thionine, in the second mixture the riboflavin was replaced by a mixture of riboflavin and methylene blue, and in the third solution the riboflavin was replaced by a mixture of thionine and methylene blue. A separate de-waxed mimeographed tissue was immersed in each of the solutions, the excess liquid was pressed off, and the tissues were allowed to dry.

Each of the tissues was exposed to the identical photopositive image of a three color printed page formed by projection of an ordinary colored transparency taken of the page. After the exposure, the tissues were dried. Each of the tissues was placed on an ordinary mimeograph machine. The machine containing the tissue wetted with the first solution was inked with the red colored ink, the machine containing the tissue which had been wetted with the second solution contained a yellow colored ink, and the machine containing the tissue wetted with the third solution contained a blue colored ink. Standard mimeograph paper was passed successively through the three machines with care being taken that the superimposed mimeographing was in exact registry. An excellent reproduction of the colored picture was effected.

Example 13

A solution having the following constituents was formed:

| | Grams |
|---|---|
| (1) Acrylamide | 30 |
| (2) N,N'-methylenebisacrylamide | 0.5 |
| (3) Allythiourea | 1 |
| (4) Riboflavin | 0.1 |
| (5) Glycerol | 50 |
| (6) Water to make up to 100 milliliters of solution. | |

The solution was poured on a glass plate and irradiated through a photographic negative with visible light. The plate was then washed with water to remove the unirradiated and unpolymerized portions. The remaining relief constituted a photographic print of the negative in relief and when inked and pressed with paper an extremely high quality and true reproduction print was produced.

Example 14

Example 13 was repeated using the following solutions:

A. The solution of Example 13 with the acrylamide replaced by methacrylamide, vinyl pyrrolidone, and acrylic acid, respectively.

B. The solution of Example 13 with the N,N'-methylenebisacrylamide replaced by calcium acrylate, by N,N'-diallymelamine, respectively.

C. The solution of Example 13 with the riboflavin and allylthiourea replaced by the dye-reducing agent combinations: rose bengal and thiourea phloxine, and ascorbic acid, erythrosin, and glutathione, acriflavin and acidified stannous chloride, fluorescein and hydroxylamine, hematoporphyrine and hydrazine, respectively.

D. The solution of Example 13 with glycerol replaced by sucrose and dextrose, respectively. When using these solutions results comparable to those obtained in Example 13 were achieved.

Example 15

The following mixture was made up:

| | Grams |
|---|---|
| (1) Methacrylamide | 35 |
| (2) N,N'-diallylmelamine | 0.3 |
| (3) Rose bengal | 0.01 |
| (4) Phenylhydrazine hydrochloride | 1 |
| (5) Glycerol | 50 |
| (6) Gelatin | 5 |
| (7) Water to make up to 100 milliliters of solution. | |

The solution was heated to 50° C. to dissolve the gelatin, and poured on to a glass plate. The gelatin film containing the imbibed mixture was irradiated through a photographic negative with visible light. The plate was then soaked in water to remove soluble gelatin and un-irradiated material, and dried. The remaining relief was then inked and pressed to a paper to give a reproduction print.

*Example 16*

A mixture as given in Example 9 was made, but in addition to rose bengal, two more dyes were added, namely acriflavin (0.01 gram) and brilliant green (0.01 gram) and the plate was made up as described in Example 9.

A photograph of a well-illuminated subject was taken in a bellows-type camera using this plate as the photographic plate. The exposed plate was then soaked in water and dried. The image was inked with black ink, forming a picture of the original subject.

*Example 17*

Three individual plates were made up as in Example 10, excepting that in the first plate the dye is acriflavin, in the second plate the dye is rose bengal, and in the third plate the dye is brilliant green. The plates were then introduced into a one-hot, three-color camera, and a picture was taken of a well-illuminated, colored subject. After soaking in water and then drying, the first plate was inked with a blue ink, the second with a green ink, and the third with a red ink and successively pressed against a single sheet of paper. The resulting image on the paper is a color reproduction of the original subject.

*Example 18*

The plate of Example 15, placed against the conventional fluoroscope screen and X-rays from a conventional X-ray machine are projected through a human chest against the screen. The plate is then soaked in water to remove the soluble gelatin and the unirradiated material and dried. The remaining relief corresponds to an X-ray photograph of the chest portion.

*Example 19*

The solution of Example 15 is coated on a flexible polyethylene tape and allowed to dry. The tape is wrapped around the weld and a 2" diameter pipe with the solution side up and a second tape, coated with a fluorescent material, such as powdered anthracene is wrapped around the first tape. A small slug of cobalt 60 in a capsule is inserted in the center of the pipe at the area of the weld and allowed to remain in the central position about 15 minutes. Thereafter, the cobalt is moved, the tape unwrapped. The tape is coated with solution, is soaked in water and then allowed to dry. A X-ray photograph corresponding to the weld and from which the soundness of the weld may be determined remains on the tape.

The same result may be obtained if the anthracene powder is initially incorporated into the solution.

*Example 20*

The solution of Example 1 was formed except in amount to make up two quarts. This was placed in a glass tray of two-quart capacity, having sides 3½" high. A chart of a portion of the "ocean" bottom colored with shades of the blue, with deeper blues being used for increasing depths, was projected by means of a magic lantern on to the bottom of the glass tray for about 15 to 20 minutes.

The unpolymerized portions were then spilled out from the tray and the remaining polymerized portions washed with water. There remained at the bottom of the tray a three-dimensional contour map corresponding to the initial chart.

*Example 21*

EXAMPLE OF USE OF CALCIUM ACRYLATE

The following solution was made up at 45° C.:

| | Grams |
|---|---|
| Gelatin | 5 |
| Calcium acrylate | 30 |
| Azure A | 0.1 |
| Sodium thiosulphate | 1 |

Water to make up to 100 parts.

The above solution was allowed to gel by standing at room temperature.

A photographic negative transparency was placed on the sample and was illustrated with red light from a 100 watt tungsten lamp for ten seconds. The image produced (white scattering material formed in the light-struck areas) was fixed by washing with a solution of 0.1% hydrogen peroxide.

I claim:

1. A photo reproduction process which comprises establishing on a base a surface of a solution containing at least 20% by weight of a vinyl monomer, polymerizable to a solid polymer, an organic photo-reducible dye and a reducing agent having a reduction potential incapable of reducing said dye in the absence of light but of sufficient strength to reduce the photo-excited dye, said dye and reducing agent forming a stable system in the absence of light which undergoes reduction of the dye upon exposure to visible light, said solution comprising a solvent for a soluble vinyl polymer corresponding to the polymer of said vinyl monomer, said dye and reducing agent being present in sufficient amount to produce free radicals for the polymerization of said polymerizable vinyl monomer when irradiated with visible light, irradiating said surface with visible light having variations in intensity corresponding to an image to be reproduced thereby transforming the light struck areas into a coherent mass by polymerization and thereafter selectively removing the unpolymerized portions from said surface.

2. Process according to claim 1, in which said solution contains a cross-linking agent.

3. Process according to claim 2, in which said solution contains a member selected from the group consisting of glycerol, sucrose, and dextrose.

4. Process according to claim 1, in which said polymerizable vinyl compound is a member selected from the group consisting of acrylonitrile, methacrylonitrile, methacrylic acid, acrylic acid, acrylamide, methacrylamide, vinylpyrrolidone, vinyl acetate, methyl methacrylate, methyl acrylate, calcium acrylate, and styrene, said photoreducible dye being a member selected from the group consisting of rose bengal, phloxine, erythrosine, eosin, fluorescein, acriflavine, riboflavin, water-soluble and fat-soluble chlorophylls, and hematoporphyrin, said reducing agent being a member selected from the group consisting of stannous chloride, ascorbic acid, glutathione, hydroxylamine, hydrazine, phenyl hydrazine, dichlorphenyl hydrazine, thiourea, and allyl thiourea, and including a cross-linking agent selected from the group consisting of calcium acrylate, N,N-diallylmelamine, N,N'-methylbisacrylamide, triallylcyanurate, and divinyl benzene.

5. Process according to claim 4, in which said solution additionally contains a member selected from the group consisting of glycerol, sucrose, and dextrose.

6. Process according to claim 5, in which said solution is positioned on a backing plate.

7. Process according to claim 1, in which said solution is an aqueous solution of acrylamide, said photo-reducible dye is a member selected from the group consisting of rose bengal, phloxine, erythrosine, eosin, fluorescein, acriflavine, riboflavin, water-soluble and fat-soluble chlorophylls, and hematoporphyrin, said reducing agent is a member selected from the group consisting of stannous chloride, ascorbic acid, glutathione, hydroxylamine, hydrazine, phenyl hydrazine, dichlorophenyl hydrazine, thiourea, and allyl thiourea, and including a cross-linking agent selected from the group consisting of calcium acrylate, N,N-diallylmelamine, N,N'-methylbisacrylamide, triallyl cyanurate, and divinyl benzene.

8. Process according to claim 7 in which said solution additionally contains a member selected from the group consisting of glycerol, sucrose, and dextrose.

9. Process according to claim 8, in which said irradiation is effected in the presence of the ambient atmospheric oxygen.

10. Process according to claim 1, in which said polymerizable vinyl monomer comprises said mild reducing agent.

11. A radiography process which comprises exposing a fluorescent material to Roentgen rays after passing through the mass to be photographed, exposing a liquid solution containing separate and distinct from said fluorescent material at least 20% of a vinyl monomer polymerizable to a solid soluble polymer, an organic photo-reducible dye and a reducing agent having a reduction potential incapable of reducing said dye in the absence of light but of sufficient strength to reduce the photo excited dye, said dye and reducing agent forming a stable system in the absence of light which undergoes reduction of the dye upon exposure to visible light, said solution comprising a solvent for a soluble vinyl polymer corresponding to a vinyl polymer of said monomer, said dye and reducing agent being present in sufficient amount to produce free radicals for the polymerization of said polymerizable vinyl monomer when irradiated with visible light, to said fluorescent material to thereby selectively polymerize portions of said solution, and thereafter washing away the unpolymerized portion.

12. A backing coated with a solution containing at least 20% of a vinyl monomer polymerizable to a solid soluble polymer, an organic photo-reducible dye and a reducing agent having a reduction potential incapable of reducing said dye in the absence of light but of sufficient strength to reduce the photo-excited dye, said dye and reducing agent forming a stable system in the absence of light which undergoes reduction of the dye upon exposure to visible light, said solution comprising a solvent for a soluble vinyl polymer corresponding to a vinyl polymer of said monomer, said dye and reducing agent being present in sufficient amount to produce free radicals for the polymerization of said polymerizable vinyl monomer when irradiated with visible light and a separate and distinct fluorescent material positioned adjacent said solution to expose said solution with visible light upon fluorescence thereof.

13. Process for color printing which comprises irradiating at least 3 separate plates each coated with a layer of a solution containing at least 20% by weight of a vinyl monomer polymerizable to a solid polymer, an organic photo-reducible dye, and a reducing agent having a reduction potential incapable of reducing said dye in the absence of light but of sufficient strength to reduce the photo-excited dye, said dye and reducing agent forming a stable system in the absence of light, which undergoes reduction of the dye upon exposure to visible light, said solution comprising a solvent for a soluble vinyl polymer corresponding to a polymer of said vinyl monomer, said dye and reducing agent being present in sufficient amount to produce free radicals for the polymerization of said polymerizable vinyl monomer when irradiated with visible light, with an identical photonegative color image, the solution coating each plate having a photo reducible dye with an absorption maximum for a different primary color, thereafter washing the unpolymerized portion from said plates, drying the plates, and inking each plate with an ink having a color complementary to the absorption maximum of its dye, and thereafter printing superimposed images with said plates.

14. Process according to claim 13, in which one of said plates contains riboflavin as the photo reducible dye and is inked with yellow ink, another of the plates containing rose bengal as the photo reducible dye, and is inked with a magenta colored ink, and the third plate containing methylene blue as the photo reducible dye, and is inked with a cyan colored ink.

15. Process for color intaglio printing which comprises irradiating at least 3 separate plates, each coated with a solution containing at least 20% by weight of a vinyl monomer polymerizable to a solid polymer, an organic photo-reducible dye, and a reducing agent having a reduction potential incapable of reducing said dye in the absence of light but of sufficient strength to reduce the photo-excited dye, said dye and reducing agent forming a stable system in the absence of light, which undergoes reduction of the dye upon exposure to visible light, said solution comprising a solvent for a soluble vinyl polymer corresponding to a polymer of said vinyl monomer, said dye and reducing agent being present in sufficient amount to produce free radicals for the polymerization of said polymerizable vinyl monomer when irradiated with visible light, with the identical photo positive color image, the solution coating one plate having a mixture of photo reducible dyes with an absorption maximum in the blue and at least one of yellow and green ranges, the solution coating the second plate having a mixture of photo reducible dyes with an absorption maximum in the blue and red ranges, and the solution coating the third plate having a mixture of photo reducible dyes with an absorption maximum in the red and at least one of the yellow and green ranges, thereafter washing the unpolymerized portions from said plates, drying the plates, and inking each plate with a separate primary color ink, the first plate being inked with a magenta colored ink, the second plate being inked with at least one of the yellow and green colored ink and the third plate being inked with a cyan colored ink, and thereafter intaglio printing superimposed images with said plates.

16. Process according to claim 15, in which said first plate contains a mixture of riboflavin and a member selected from the group consisting of thionine and rose bengal as the photo reducible dye, the second containing a mixture of riboflavin methylene blue as the photo reducible dye and the third plate containing a mixture of a member selected from the group consisting of thionine and rose bengal with methylene blue as the photo reducible dye.

17. Process for color stencil printing, which comprises incorporating a photo sensitive polymerization mixture in at least 3 separate ink permeable sheets, said photo sensitive polymerization mixture comprising a solution containing at least 20% by weight of a vinyl monomer polymerizable to a solid polymer, an organic photo-reducible dye, and a reducing agent having a reduction potential incapable of reducing said dye in the absence of light but of sufficient strength to reduce the photo-excited dye, said dye and reducing agent forming a stable system in the absence of light, which undergoes reduction of the dye upon exposure to visible light, said solution comprising a solvent for a soluble vinyl polymer corresponding to a polymer of said vinyl monomer, said dye and reducing agent being present in sufficient amount to produce free radicals for the polymerization of said polymerizable vinyl monomer when irradiated with visible light, the photo-reducible dye on the first sheet comprising a mixture of photo reducible dyes having an absorption maximum in the blue and at least one of the yelow and green range, the photo reducible dye for the second sheet comprising a mixture of photo reducible dyes having an absorption maximum in the red and blue ranges, the photo reducible dye for the third sheet comprising a mixture of photo reducible dyes having absorption maximum in the red and at least one of the yellow and green ranges, thereafter separately irradiating the sheets with the identical photo positive color image, washing the unpolymerized portions from each sheet, and printing superimposed images on the sheets by forcing a magenta colored ink through the first sheet, at least one of yellow and green colored ink through the second sheet and a cyan colored ink through the third sheet.

18. Process according to claim 17, in which the first sheet contains a mixture of riboflavin wit ha member selected from the group consisting of thionine and rose bengal as the photo reducible dye, the second sheet contains methylene blue and riboflavin as a photo reducible dye, and the third sheet contains a mixture of a member selected from the group consisting of thionine and rose bengal with methylene blue as the photo reducible dye.

19. Process for the production of master forms for spirit printing which comprises incorporating a transferable dye in a layer of a photo sensitive polymerization mixture comprising a solution containing at least 20% by weight of a vinyl monomer polymerizable to a solid polymer, an organic photo-reducible dye, and a reducing agent having a reduction potential incapable of reducing said dye in the absence of light but of sufficient strength to reduce the photo-excited dye, said dye and reducing agent forming a stable system in the absence of light, which undergoes reduction of the dye upon exposure to visible light, said solution comprising a solvent for a soluble vinyl polymer corresponding to a polymer of said vinyl monomer, said dye and reducing agent being present in sufficient amount to produce free radicals for the polymerization of said polymerizable vinyl monomer when irradiated with visible light, thereafter irradiating the layer with a photo positive image to polymerize the illuminated portions, and selectively removing the unpolymerized portions.

References Cited in the file of this patent

UNITED STATES PATENTS

| | | |
|---|---|---|
| 1,952,787 | Bennett | Mar. 27, 1934 |
| 2,409,162 | Staud | Oct. 8, 1946 |
| 2,577,984 | Warnecke | Dec. 11, 1951 |
| 2,600,343 | Tuttle | June 10, 1952 |
| 2,740,793 | Kendall et al. | Apr. 3, 1956 |
| 2,747,997 | Smith et al. | May 29, 1956 |
| 2,760,863 | Plambeck | Aug. 28, 1956 |
| 2,875,047 | Oster | Feb. 24, 1959 |

FOREIGN PATENTS

| | | |
|---|---|---|
| 618,181 | Great Britain | Feb. 17, 1949 |

OTHER REFERENCES

Clerc: Ilford Manual of Process Work, 5th Edition, 1951, Ilford Ltd., London, pp. 141–143, 220 and 297.

Oster: "Photographic Engineering," vol. 4, No. 3 (1953), pages 173–178.

Hiett et al.: Silk-Screen Process Production, Blandford Press Ltd., London, 3rd Edition, 1950, pages 54 and 107–111.

Kosloff: Screen Process Printing, The Signs of the Times Publishing Co., Toledo, 1950, pp. 29, 33, 34, 36 and 90–97.

UNITED STATES PATENT OFFICE
CERTIFICATE OF CORRECTION

Patent No. 3,097,096                      July 9, 1963

Gerald Oster

It is hereby certified that error appears in the above numbered patent requiring correction and that the said Letters Patent should read as corrected below.

Column 1, line 23, for "monomerms" read -- monomers --; line 26, for "polymer. The photo-reducible dye and the reducing agent" read -- monomer, a photo-reducible dye, and a reducing agent, --; line 53, for "description;" read -- description: --; column 2, line 37, after "tate" insert a comma; column 6, line 35, for "affected" read -- effected --; column 7, line 48, for "is polymerized from" read -- in polymerized form --; column 10, line 57, for "Acrylamine" read -- Acrylamide --; column 12, line 18, for "N-tertiarylbutyl" read -- N-tertiarybutyl --; column 15, line 26, for "one-hot" read -- one-shot --; line 55, for "A" read -- An --; column 17, line 1, for "dichlorophenyl" read -- dichlorphenyl --; column 19, line 7, for "wit ha" read -- with a --.

Signed and sealed this 7th day of January 1964.

(SEAL)
Attest:

ERNEST W. SWIDER

Attesting Officer

EDWIN L. REYNOLDS
Acting Commissioner
of Patents